Oct. 30, 1956 G. R. FORRER ET AL 2,769,095

X-RAY FILM CASSETTE

Filed May 24, 1951

INVENTORS
Gilbert R. Forrer
BY Williard L. Schwinn

ATTORNEY

United States Patent Office 2,769,095
Patented Oct. 30, 1956

2,769,095

X-RAY FILM CASSETTE

Gilbert R. Forrer, Akron, and Willard L. Schwinn, Barberton, Ohio, assignors to The Babcock & Wilcox Company, Rockleigh, N. J., a corporation of New Jersey Application May 24, 1951, Serial No. 228,085

6 Claims. (Cl. 250—68)

This invention relates to film cassettes or exposure holders, and, more particularly, to an X-ray film cassette of novel construction arranged for complete mechanical protection of the film during exposure and having a flexibility whereby the cassette may be readily conformed to surfaces of various shapes.

X-ray techniques have found wide application in industry for examination of castings, welds, and the like, to determine the interior soundness of metallic structures. In such X-ray examination, the X-ray film is mounted in a cassette or film holder which is substantially opaque to light rays, and a source of X-rays is arranged to direct radiation through the material being examined onto the film. Intensifying screens of such materials as lead and calcium tungstate are generally provided in the cassettes to prevent the film from being affected by secondary radiation.

The present invention is directed to an X-ray film cassette of novel construction whereby the film is completely enclosed between overlapping panels, each covering the full area of the film. The cassette comprises a substantially flat structure of opaque material, such as a black composition material, having longitudinal fold lines dividing the structure into panels. Transverse fold lines are provided dividing each panel into a main panel section, having substantially the area of the X-ray film, and a pair of end flaps. The flat structure and its fold lines are preferably provided by forming individual sheets of the plastic composition material and hingedly interconnecting the same by strips of flexible opaque tape. A preferred material is one of the polyvinyl compositions. The inner surface of two (2) transversely adjacent main panel sections have bonded thereto, in full surface-to-surface adhesion, thin sheets of lead foil.

In the use of the invention cassette, the structure is opened out flat and the film is placed against one of the lead foil sheets. The structure is then folded about a longitudinal fold line to bring the other lead foil sheet against the other surface of the film, and the third panel is then folded over the first two panels. The folded overlapped end flaps are then folded, about the transverse fold lines, over the folded overlapped main panel sections, to fully enclose the X-ray film.

Due to the surface-to-surface bonding of the lead foil intensifying screens to the panels, wrinkling and unevenness of the screens, during use, is obviated, thus eliminating resultant markings on the exposed radiograph. Furthermore, as the panels are the full area of the film, no pressure line markings appear on the exposed radiograph. This has been a disadvantage in prior art practice wherein flexible cassettes did not fully overlap the film, so that, when the cassette has been firmly pressed against the surface of the object to be examined, pressure markings appeared on the film at the edges of the cassette. The full enclosure of the film within the cassette prevents any pick-up of dirt between the film and the intensifying screen and also prevents any light entering the cassette to cause light streaks to appear on the film after developing. Finally, the invention cassette can be opened fully to a flat position, thereby greatly expediting the loading of the cassette with film.

For an understanding of the invention principles, reference is made to the following description of a typical embodiment thereof as illustrated in the accompanying drawing.

Figures 1, 3:
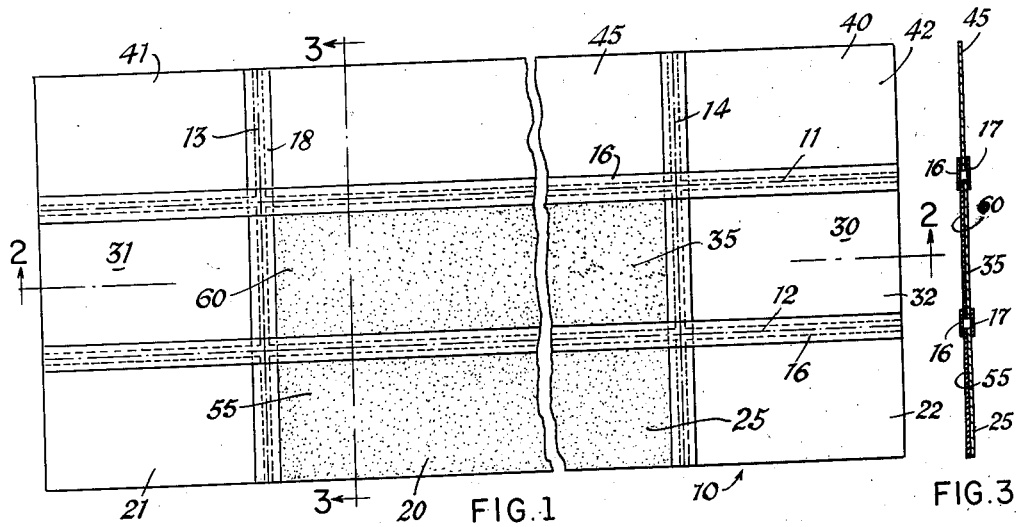
Fig. 1 is a plan view of the invention cassette in the fully open condition.
Fig. 3 is a transverse sectional view on the line 3—3 of Fig. 1.
Figure 2:
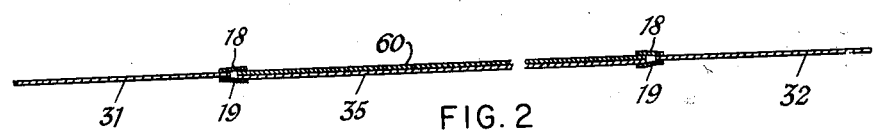
Fig. 2 is a longitudinal sectional view on the line 2—2 of Fig. 1.

Referring to the drawing, the X-ray cassette is generally indicated at 10 as a substantially flat structure including three (3) panels 20, 30 and 40 formed by longitudinal fold lines generally indicated at 11 and 12. Transverse fold lines 13 and 14 divide the three (3) panels into main panel sections 25, 35 and 45 and end flaps 21, 31 and 41, and 22, 32, and 42.

Each of the several panel sections comprises a sheet of opaque plastic composition material, such as a black vinyl resin. This particular material has advantages in that it will withstand abuse without deteriorating or cracking and thus spoiling of expensive X-ray exposures. Each of the main panel sections 25 and 35 has bonded thereto, in surface-to-surface relation therewith, a lead foil intensifying screen such as 55 and 60.

The longitudinal fold lines 11, 12 are provided with pairs of adhesive tapes 16, 17 secured to either surface of the panels in such manner as to provide a gap between the adjacent longitudinal edges of the panels. The transverse fold lines 13, 14 are provided with a pair of tapes 18 and 19, likewise each secured adhesively to a surface of a main section and a surface of an end flap, with the joined members being spaced to provide a gap therebetween. The gaps provided by the joining tapes allow easy folding of the panels onto each other, and the folded end flaps onto the folded main panel sections without bending or cracking of the panel material.

In the application of the invention cassette, the cassette 10 is arranged as shown in Fig. 1, and an X-ray film such as 70 (Fig. 5) is laid on one of the intensifying screens such as 60. Panel 20 is then folded over onto panel 30 about fold line 12 so that screen 55 engages the upper surface of film 70. Panel 40 is then folded over about fold line 11 to lie on folded over panel 20. The end flaps, which have also been folded about fold lines 11 and 12, are then folded about transverse fold lines 13 and 14 so that the cassette appears as shown in Fig. 4.

Figure 4:
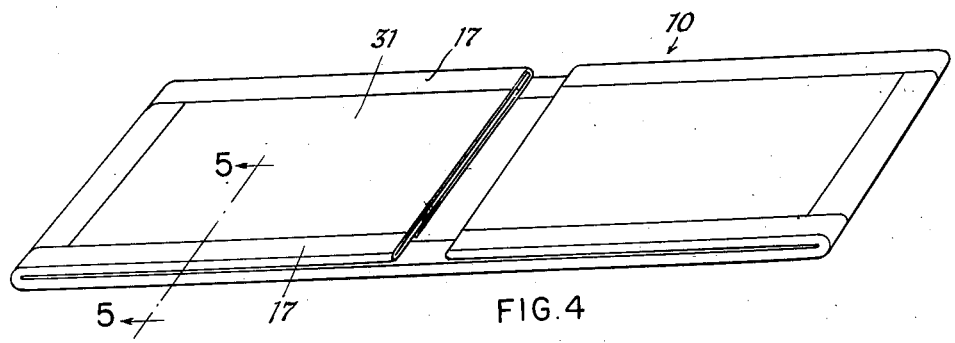
Fig. 4 is a perspective view of the invention cassette in the loaded condition.
Figure 5:
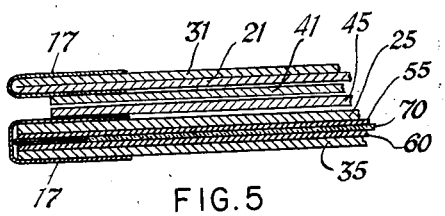
Fig. 5 is an enlarged partial transverse sectional view on the line 5—5 of Fig. 4.

Referring to Figs. 4 and 5, it will be noted that the film is disposed between intensifying screens 55 and 60. The longitudinal edges of the film are enclosed by the tapes 16, 17, and the transverse edges thereof by the tapes 18 and 19. Thus, entry of light or dirt onto the cassette is effectively inhibited.

Figure 6:
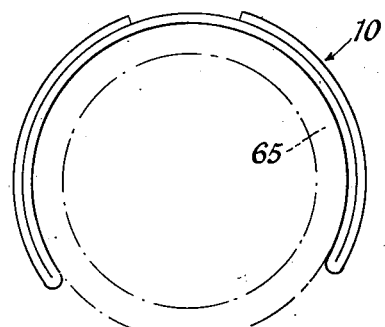
Fig. 6 is an end elevation view of the loaded cassette as applied to the radiographic examination of a cylindrical member.

Fig. 6 shows a typical application of the loaded cassette. As applied to the X-ray examination of a cylindrical object 65, the cassette 10 is pressed around the outer surface, for example, of object 65 with the folded over end flaps disposed outwardly. The cassette is held in firm pressure engagement with such outer surface while film 70 is exposed by disposing a source of X-rays within the interior of object 65. The procedure may be reversed, by disposing the cassette within and in engagement with the interior surface of object 65 and directing X-rays through the object from a source external thereto. The application shown in Fig. 6 is exemplary only, and the cassette, due to its flexibility, is readily adapted to the examination of other types of surfaces whether plane, circular, or irregular.

While a specific embodiment of the invention has been shown and described in detail to illustrate the application of the invention principles, it will be understood that the invention may be otherwise embodied without departing from such principles.

We claim:

1. A flexible re-usable X-ray film cassette comprising a flat sheet-like structure of flexible opaque non-metallic material having fold lines dividing the structure into three substantially equal panels, each panel having a contour and dimensions corresponding substantially to those of the film; each of two transversely adjacent panels having a metal intensifying screen bonded to its inner surface whereby, when a film is placed on one screen, the adjacent screen-carrying panel may be folded onto the other surface of the film and the third panel folded over the other two panels to completely contain the film.

2. A flexible re-usable X-ray film cassette comprising a flat sheet-like structure of flexible opaque non-metallic material having fold lines dividing the structure into three substantially equal panels, each panel having a contour and dimensions corresponding substantially to those of the film; the center panel and one outer panel each having a metal intensifying screen bonded to its inner surface whereby, when a film is placed on the screen of the center panel, such one outer panel may be folded over to enclose the film between the two screens and the other outer panel may be folded onto such one outer panel to completely contain the film.

3. A flexible re-usable X-ray cassette comprising a flat sheet-like structure of flexible opaque non-metallic material having fold lines dividing the structure into three substantially equal panels, and a pair of transverse fold lines dividing each panel into a main section and a pair of end flaps; each of the three panels having a width substantially equal to that of the film; the length of each main section being substantially equal to that of the film, and the conjoint length of the flaps of each panel being substantially equal to that of the film; at least one main section having an intensifying screen bonded to its inner surface, whereby, when a film is placed on the screen, the adjacent panel may be folded over to enclose the film between two main panel sections, the third panel may be folded over the other two panels, and the folded over end flaps folded onto the overlapped main sections.

4. A flexible re-usable X-ray film cassette comprising a flat sheet-like structure of flexible opaque non-metallic material having fold lines dividing the structure into three substantially equal panels, and a pair of transverse fold lines dividing each panel into a main section and a pair of end flaps; each of the three panels having a width substantially equal to that of the film; the length of each main section being substantially equal to that of the film, and the conjoint length of the flaps of each panel being substantially equal to that of the film; each of two transversely adjacent main panel sections having a metal intensifying screen bonded to its inner surface, whereby, when a film is placed on one screen, the adjacent screen-carrying panel may be folded onto the other surface of the film, the third panel folded over the other two panels, and the folded over end flaps folded onto the overlapped main sections.

5. A flexible re-usable X-ray film cassette comprising a flat sheet-like structure of flexible opaque non-metallic material having fold lines dividing the structure into three substantially equal panels, and a pair of transverse fold lines dividing each panel into a main section and a pair of end flaps; each of the three panels having a width substantially equal to that of the film; the length of each main section being substantially equal to that of the film, and the conjoint length of the flaps of each panel being substantially equal to that of the film; at least one main section having a lead foil intensifying screen bonded to its inner surface, whereby, when a film is placed on the screen, the adjacent panel may be folded over to enclose the film between two main panel sections, the third panel may be folded over the other two panels, and the folded over end flaps folded onto the overlapped main sections.

6. A flexible re-usable X-ray film cassette comprising a flat sheet-like structure of flexible opaque non-metallic material having fold lines dividing the structure into three substantially equal panels, and a pair of transverse fold lines dividing each panel into a main section and a pair of end flaps; each of the three panels having a width substantially equal to that of the film; the length of each main section being substantially equal to that of the film, and the conjoint length of the flaps of each panel being substantially equal to that of the film; each of two transversely adjacent main panel sections having a lead foil intensifying screen bonded to its inner surface, whereby, when a film is placed on one screen, the adjacent screen-carrying panel may be folded onto the other surface of the film, the third panel folded over the other two panels, and the folded over end flaps folded onto the overlapped main sections.

References Cited in the file of this patent

UNITED STATES PATENTS

| | | |
|---|---|---|
| 1,367,601 | Hodgson | Feb. 8, 1921 |
| 1,521,500 | Becker | Dec. 30, 1924 |
| 2,426,884 | Kieffer | Sept. 2, 1947 |
| 2,472,599 | Luboshez | June 7, 1949 |
| 2,494,740 | Boucher | Jan. 17, 1950 |
| 2,530,321 | Armstrong | Nov. 14, 1950 |
| 2,590,892 | Reuter | Apr. 1, 1952 |